(12) United States Patent
Snider et al.

(10) Patent No.: US 11,691,482 B2
(45) Date of Patent: Jul. 4, 2023

(54) VEHICULAR REAR WINDOW ASSEMBLY WITH INTEGRATED SPOILER

(71) Applicant: Magna Mirrors of America, Inc., Holland, MI (US)

(72) Inventors: Darin J. Snider, Holland, MI (US); David K. Johnson, Holland, MI (US); Christopher J. Kovacs, Zeeland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 17/449,324

(22) Filed: Sep. 29, 2021

(65) Prior Publication Data

US 2022/0097495 A1  Mar. 31, 2022

Related U.S. Application Data

(60) Provisional application No. 63/198,119, filed on Sep. 30, 2020.

(51) Int. Cl.
*B60J 1/20* (2006.01)
*B60J 1/18* (2006.01)

(52) U.S. Cl.
CPC .......... *B60J 1/2008* (2013.01); *B60J 1/1853* (2013.01)

(58) Field of Classification Search
CPC ...... B60J 1/2008; B60J 1/2002; B60J 1/2005; B60J 1/1853; B62D 35/007
USPC ............................. 296/91, 152, 154, 180.1
See application file for complete search history.

(56) References Cited

U.S. PATENT DOCUMENTS

| | | | | |
|---|---|---|---|---|
| 4,159,843 | A | * | 7/1979 | Crossman ............ B62D 35/001 296/180.1 |
| 4,896,136 | A | * | 1/1990 | Hotovy .................... B60Q 3/74 340/479 |
| 4,920,698 | A | | 5/1990 | Friese et al. |
| 4,995,195 | A | | 2/1991 | Olberding et al. |
| 5,146,712 | A | | 9/1992 | Hlavaty |

(Continued)

FOREIGN PATENT DOCUMENTS

| | | | | |
|---|---|---|---|---|
| DE | 102004024512 A1 | * | 12/2005 | ........... B60Q 1/2607 |
| DE | 102018207801 A1 | * | 11/2019 | |

OTHER PUBLICATIONS

Lesmeister, Roland, "Motor vehicle has additional brake light arranged above rear window and indictors on either side in spoiler", machine translation, ip.com, DE 102004024512 A1, Dec. 15, 2005 (Year: 2005).*

*Primary Examiner* — Jason S Morrow
*Assistant Examiner* — Wenwei Zhuo
(74) *Attorney, Agent, or Firm* — Honigman LLP

(57) ABSTRACT

A vehicular rear window assembly includes a window panel comprising an inner side and an outer side. A spoiler includes (i) a base portion that is adhesively attached at and along an upper region of the outer side of the window panel and (ii) a cover portion that is attached at the base portion. The vehicular rear window assembly, with the spoiler adhesively attached at and along the upper region of the outer side of the window panel, is configured for mounting at a rear portion of a cabin of the vehicle. With the vehicular rear window assembly mounted at the rear portion of the cabin of the vehicle, the inner side is toward the cabin of the vehicle and the outer side and the spoiler are exterior of the vehicle.

27 Claims, 11 Drawing Sheets

(56) References Cited

U.S. PATENT DOCUMENTS

| | | |
|---|---|---|
| 5,531,046 A | 7/1996 | Kollar et al. |
| 5,572,376 A | 11/1996 | Pace |
| 5,799,444 A | 9/1998 | Freimark et al. |
| 5,996,284 A | 12/1999 | Freimark et al. |
| 6,026,611 A | 2/2000 | Ralston et al. |
| 6,119,401 A | 9/2000 | Lin et al. |
| 6,126,229 A * | 10/2000 | Lund .................. B62D 35/001 296/180.1 |
| 6,691,464 B2 | 2/2004 | Nestell et al. |
| 6,955,009 B2 | 10/2005 | Rasmussen |
| 7,003,916 B2 | 2/2006 | Nestell et al. |
| 7,073,293 B2 | 7/2006 | Galer |
| 8,151,519 B2 | 4/2012 | Bello et al. |
| 8,402,695 B2 | 3/2013 | Smith et al. |
| 8,881,458 B2 | 11/2014 | Snider et al. |
| 8,915,018 B2 | 12/2014 | Snider |
| 8,938,914 B2 | 1/2015 | Hulst et al. |
| 9,896,026 B2 * | 2/2018 | Snider .................. B60Q 1/268 |
| 10,427,503 B2 | 10/2019 | Snider |
| 10,501,008 B2 | 12/2019 | Snider |
| 10,524,313 B2 | 12/2019 | Snider et al. |
| 10,559,153 B2 | 2/2020 | Snider et al. |
| 10,668,868 B2 | 6/2020 | Snider et al. |
| 2003/0213179 A1 | 11/2003 | Galer |
| 2004/0020131 A1 | 2/2004 | Galer et al. |
| 2006/0107600 A1 * | 5/2006 | Nestell ................ E05D 15/0621 49/413 |
| 2006/0108830 A1 * | 5/2006 | Ordonio ............... B62D 35/007 296/180.1 |
| 2008/0127563 A1 | 6/2008 | Tooker |
| 2014/0047772 A1 | 2/2014 | Hulst |
| 2017/0282981 A1 * | 10/2017 | Leterrier .................. B60J 1/004 |
| 2018/0037277 A1 * | 2/2018 | Khayat ................ B62D 35/007 |
| 2018/0252382 A1 * | 9/2018 | Schellekens ............ B32B 27/08 |
| 2018/0312204 A1 * | 11/2018 | Schellekens ............ B29C 45/16 |
| 2021/0296530 A1 | 9/2021 | Bailey |
| 2022/0072992 A1 | 3/2022 | Snider |

* cited by examiner

*PRIOR ART*

VEHICULAR REAR WINDOW ASSEMBLY WITH INTEGRATED SPOILER

CROSS REFERENCE TO RELATED APPLICATION

The present application claims the filing benefits of U.S. provisional application Ser. No. 63/198,119, filed Sep. 30, 2020, which is hereby incorporated herein by reference in its entirety.

FIELD OF THE INVENTION

The present invention relates to a rear window assembly for a vehicle and, more particularly, a rear window assembly for a pickup truck or the like.

BACKGROUND OF THE INVENTION

It is known to provide a rear slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety. As shown in FIGS. 2 and 3, prior art vehicles may include a center high-mounted stop lamp (CHMSL) mounted at the sheet metal of the vehicle cabin above the window assembly.

SUMMARY OF THE INVENTION

A rear window assembly includes a lighting device having one or more strips or rows of light sources, such as a plurality of light emitting diodes (LEDs), disposed within a spoiler that is attached to and integrated into the window assembly so as to provide a glass window assembly with lighting viewable above the glass window panel. The light sources may comprise red light-emitting sources for a center high mounted stop lamp (CHMSL) of the vehicle and/or may comprise white light-emitting (or other color) light sources for a truck bed illumination function and/or may comprise white light-emitting (or other color) light sources for an interior cabin illumination function and/or or the like. The lighting device is electrically connected to a wiring harness or circuitry or user input of the vehicle when the window assembly is installed or mounted at the vehicle. The window assembly, including the window panel and spoiler and lighting device, is installed at the vehicle as a unit, whereby electrical connection to the lighting device is made during installation of the window assembly or unit at the vehicle.

These and other objects, advantages, purposes and features of the present invention will become apparent upon review of the following specification in conjunction with the drawings.

DESCRIPTION OF THE PREFERRED EMBODIMENTS

Figure 1:
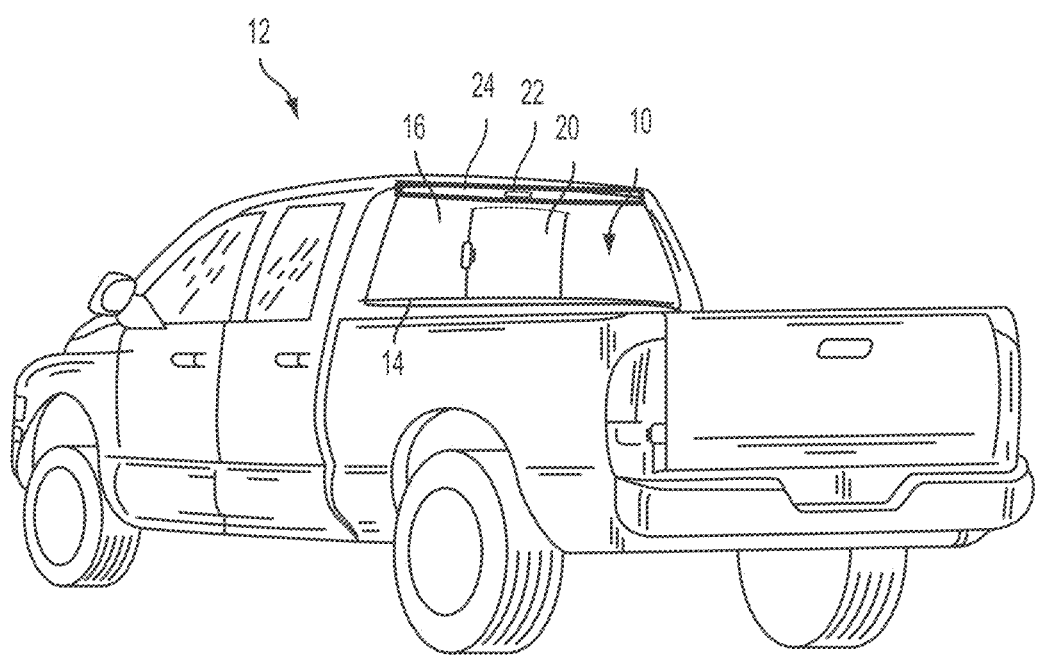
FIG. 1 is a rear perspective view of a pickup truck having a rear slider window assembly.
Figure 2:
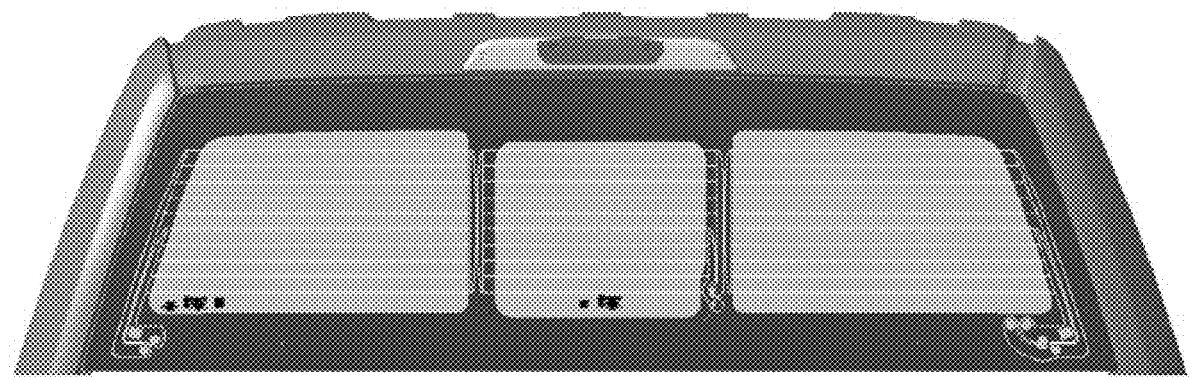
FIGS. 2 and 3 are views of a prior art vehicle with a separate lighting device attached at the vehicle above the rear slider window assembly.
Figure 3:
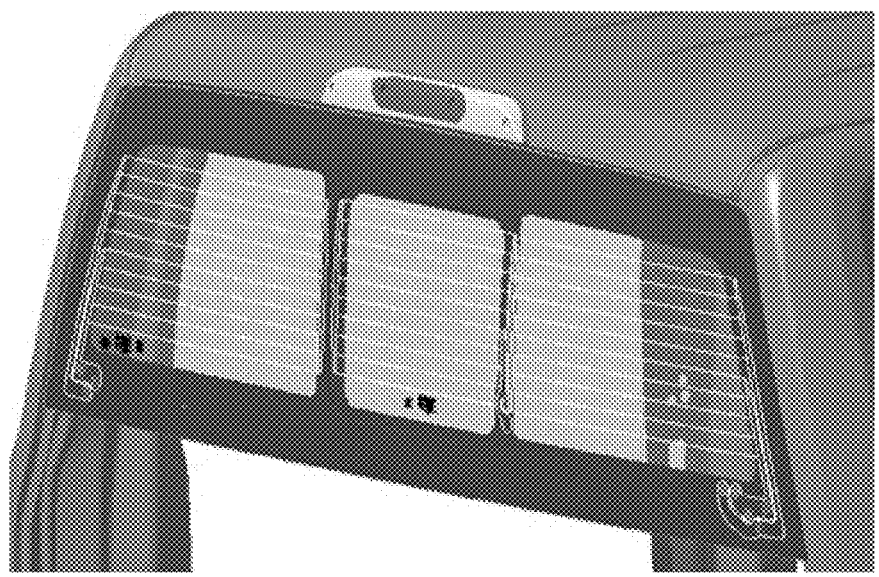
Figure 4:
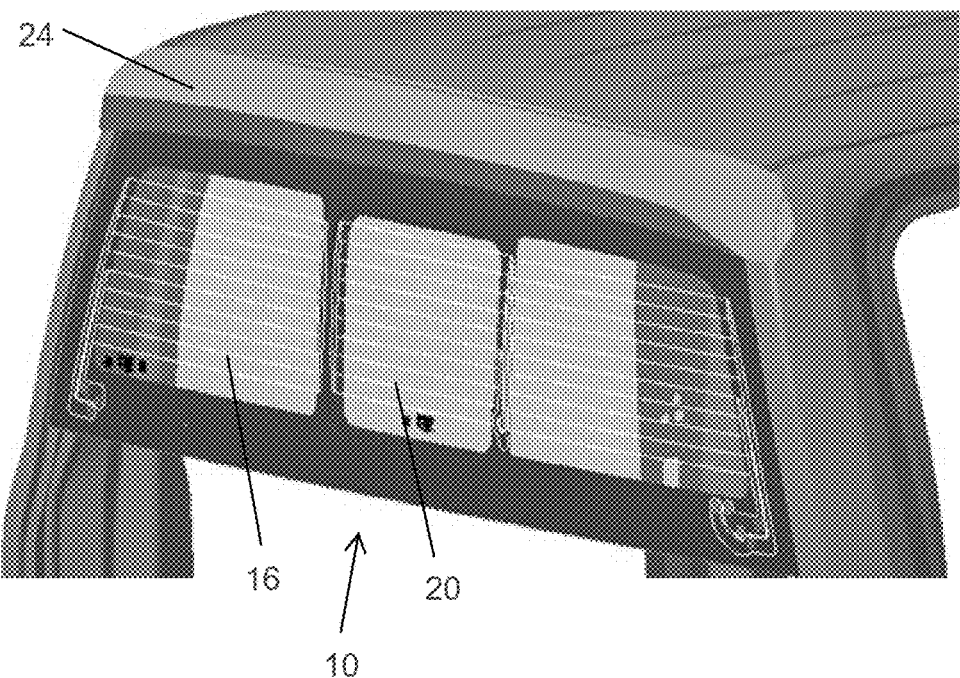
FIG. 4 is a perspective view of the window assembly, as installed at the vehicle, showing the spoiler and lighting device adhesively bonded to or integrated on the glass window panel.
Figure 5:
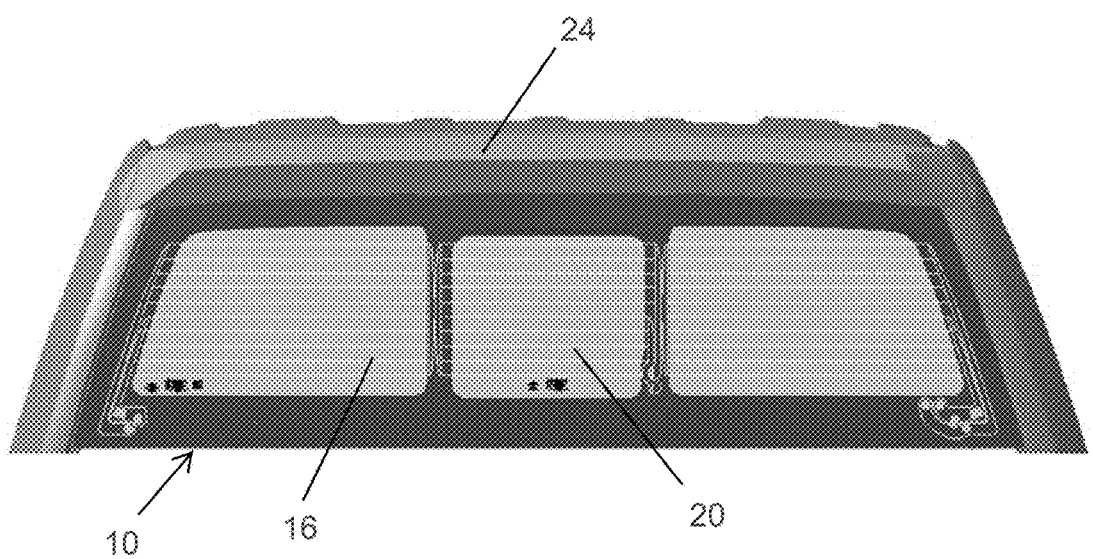
FIG. 5 is a rear plan view of the window assembly of FIG. 4.
Figure 6:
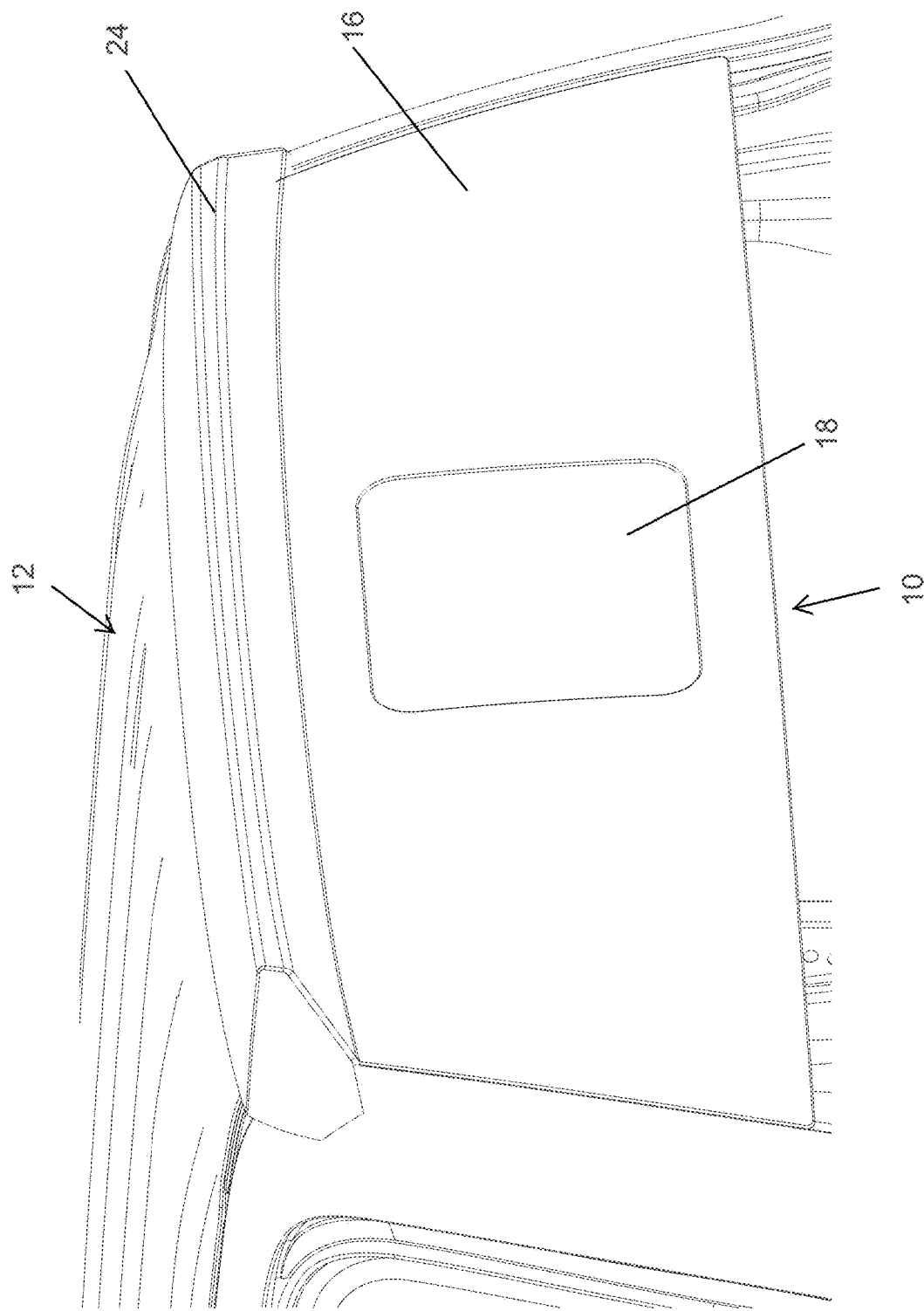
FIG. 6 is another perspective view of the window assembly of FIG. 4.

Referring now to the drawings and the illustrative embodiments depicted therein, a rear slider window assembly 10 of a vehicle 12 (such as a pickup truck or the like) includes a window frame 14, a window panel, such as a fixed window panel 16 having an aperture 18 that separates side window portions and a movable window panel 20 that is movable relative to frame 14 and fixed window panel 16 between an opened position and a closed position (FIGS. 1, 4 and 5). The window assembly 10 includes a spoiler 24 adhesively bonded or otherwise attached or integrated on the glass window panel 16 and above and along a center region of an upper rail of the frame 14.

The spoiler 24 may include a lighting system having a lighting device 22 disposed within the spoiler 24 of the window assembly 10. The lighting device 22, when activated, emits light that is viewable above the window panel 16. The lighting device 22 may comprise a center high mounted stop lamp (CHMSL) for the vehicle, whereby the lighting system may actuate the lighting device 22 as part of a brake light system of the vehicle, or the lighting device 22 may comprise a plurality of white light emitting lights, whereby the lighting system may actuate the lighting device 22 as part of a truck bed illumination system, or the lighting device 22 may comprise a plurality of white light emitting lights, whereby the lighting system may actuate the lighting device as part of an interior cabin illumination system or the like, as discussed below. The lighting device 22 is disposed within the spoiler 24 that is part of the window assembly such that the window assembly, including the spoiler 24 and the lighting device 22, is attached at or installed at a vehicle as a unit. The lighting device and window assembly may utilize aspects of the lighting devices and window assemblies described in U.S. Pat. Nos. 10,668,868; 10,501,008 and/or 9,896,026, and/or U.S. patent application Ser. No. 17/447,296, filed Sep. 10, 2021, which published on Mar. 10, 2022 as U.S. Publication No. US-2022-0072992, which are hereby incorporated herein by reference in their entireties.

In the illustrated embodiment, the window assembly 10 comprises a hole-in-glass window configuration, where a single fixed glass panel 16 has an aperture or hole or opening 18 established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening therebetween, with upper and lower appliqués or trim or filler panels or elements disposed at the upper and lower regions of the opening and between the fixed window panels, and with the spoiler adhesively attached at the fixed window panels and along the upper appliqué.

The frame 14 comprises an upper rail and a lower rail, with the upper and lower edge regions of movable window panel 20 movably or slidably received in and along the respective upper and lower rails. The slider or movable window panel 20 is movable along the lower rail and upper rail of the frame portion 14 to open and close the aperture or opening 18, such as in a manner similar to known slider window assemblies. The slider window panel 20 may be disposed at a lower carrier, which may receive the lower perimeter edge region of the slider window panel 20 therein and may be slidably or movably received in the channel portion of the lower rail of the frame portion 14. The upper rail may comprise any suitable channel or rail element configured to slidably receive an upper edge portion of the movable window panel, and the upper rail may comprise a unitarily formed upper rail or channel.

As shown in FIGS. 4-7B, the window assembly 10 includes an integrated spoiler 24, which may include a lighting device 22 that is disposed in or housed in the spoiler 24. The lighting device 22 comprises a plurality of individual light sources 22a (FIGS. 7 and 7A), such as light emitting diodes (LEDs), or such as organic light emitting diodes (OLEDs), or such as electro-luminescent light sources, or such as or vertical-cavity surface-emitting lasers (VCSELs), or the like, arranged in at least one row at an upper center region of the spoiler 24 above the fixed window panel 16 (and above the opening or aperture through the window panel). The light sources 22a of the lighting device 22 are operable responsive to the brake system of the vehicle and provide a center high-mounted stop lamp (CHMSL) at the center region of the spoiler 24 and window assembly 10. Optionally, the lighting device 22 of the spoiler 24 may also or otherwise include truck bed illumination lights 22b (FIGS. 7 and 7B) disposed at side regions of the spoiler 24 and angled downward and rearward for providing light at or in the truck bed of the pickup truck equipped with the window assembly 10.

Figure 7:
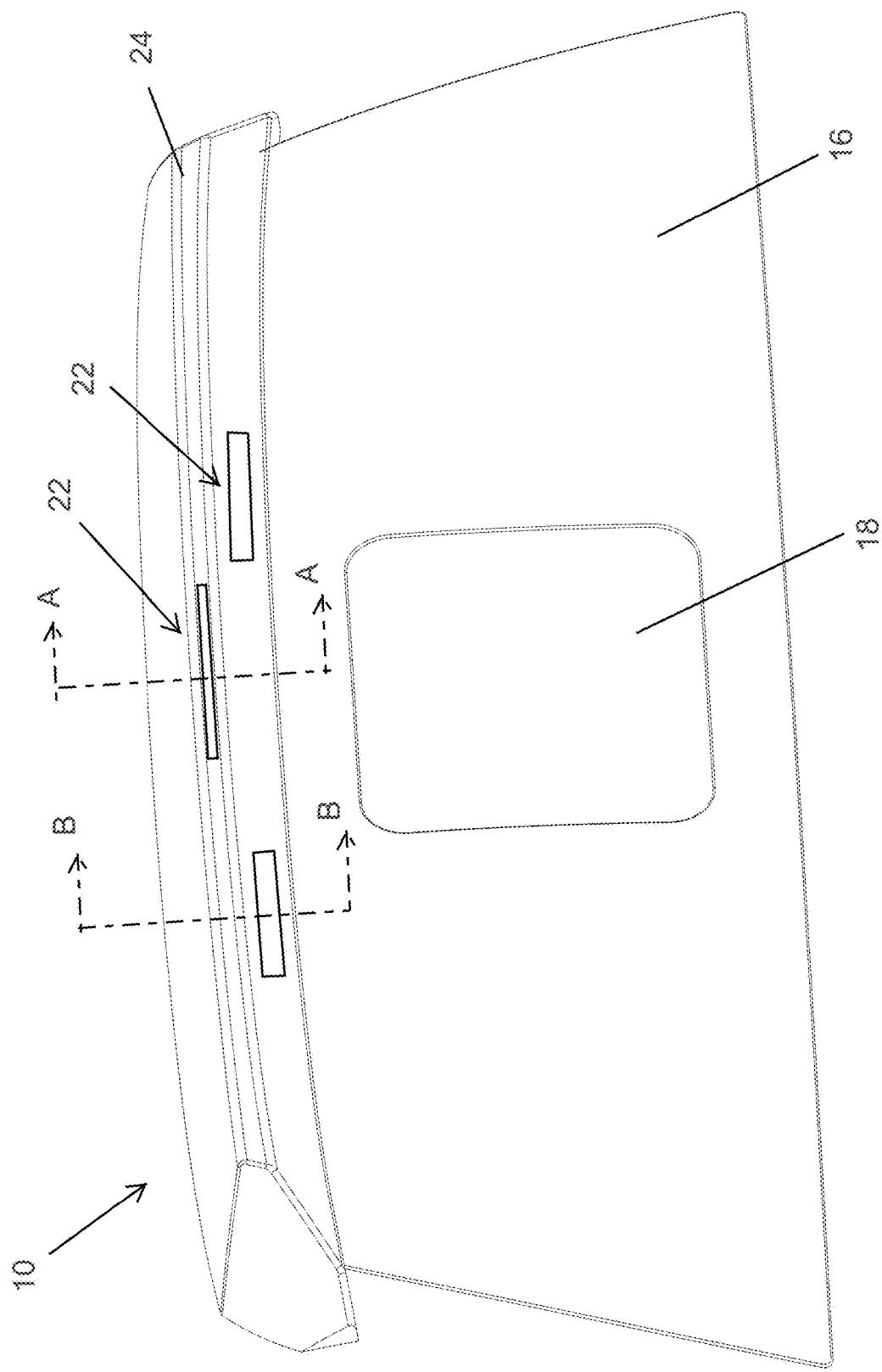
FIG. 7 is another perspective view of the window assembly, shown without the vehicle, and showing the lighting device at the spoiler.
Figure 7A:
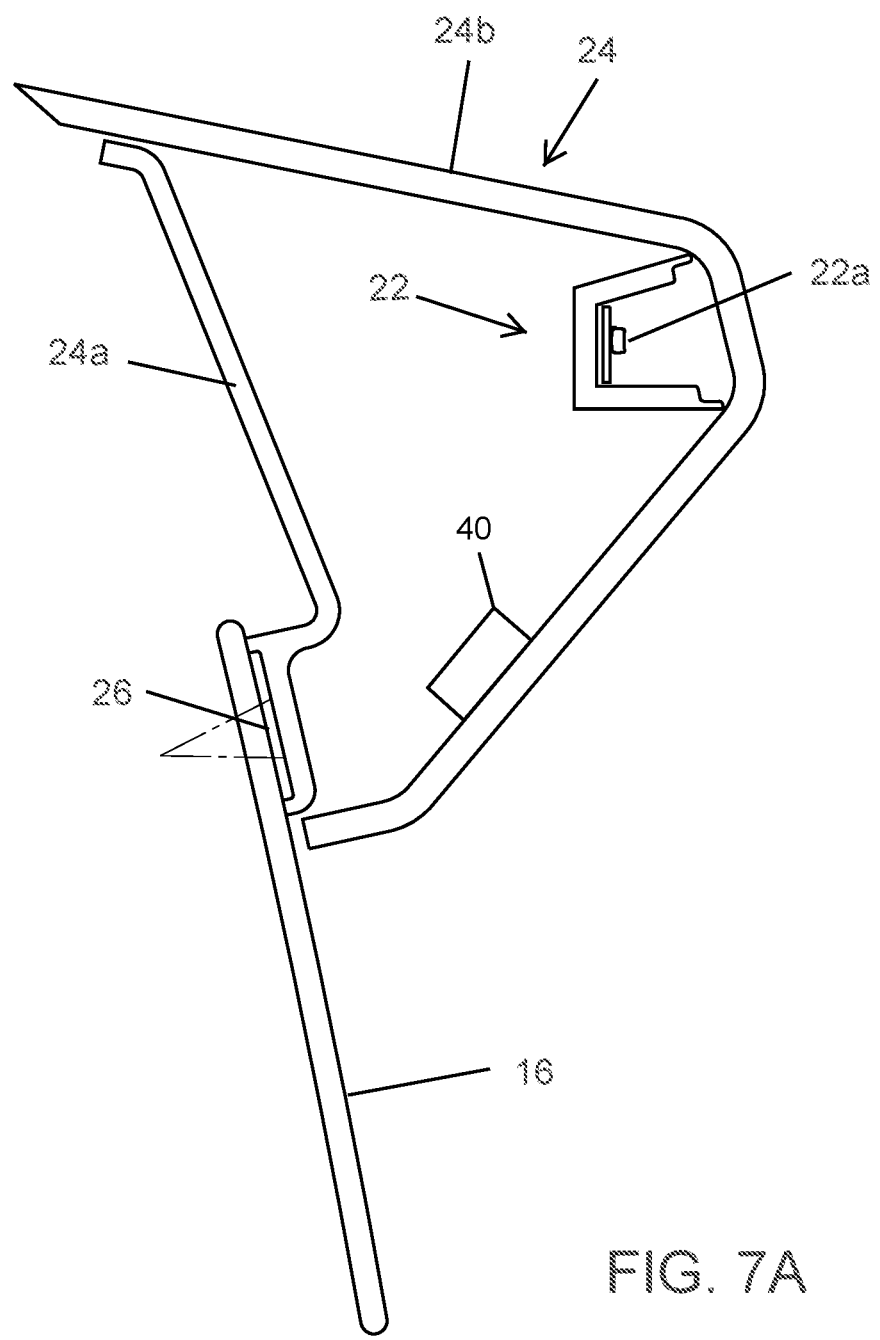
FIG. 7A is a sectional view of the window assembly taken along the line A-A in FIG. 7.
Figure 7B:
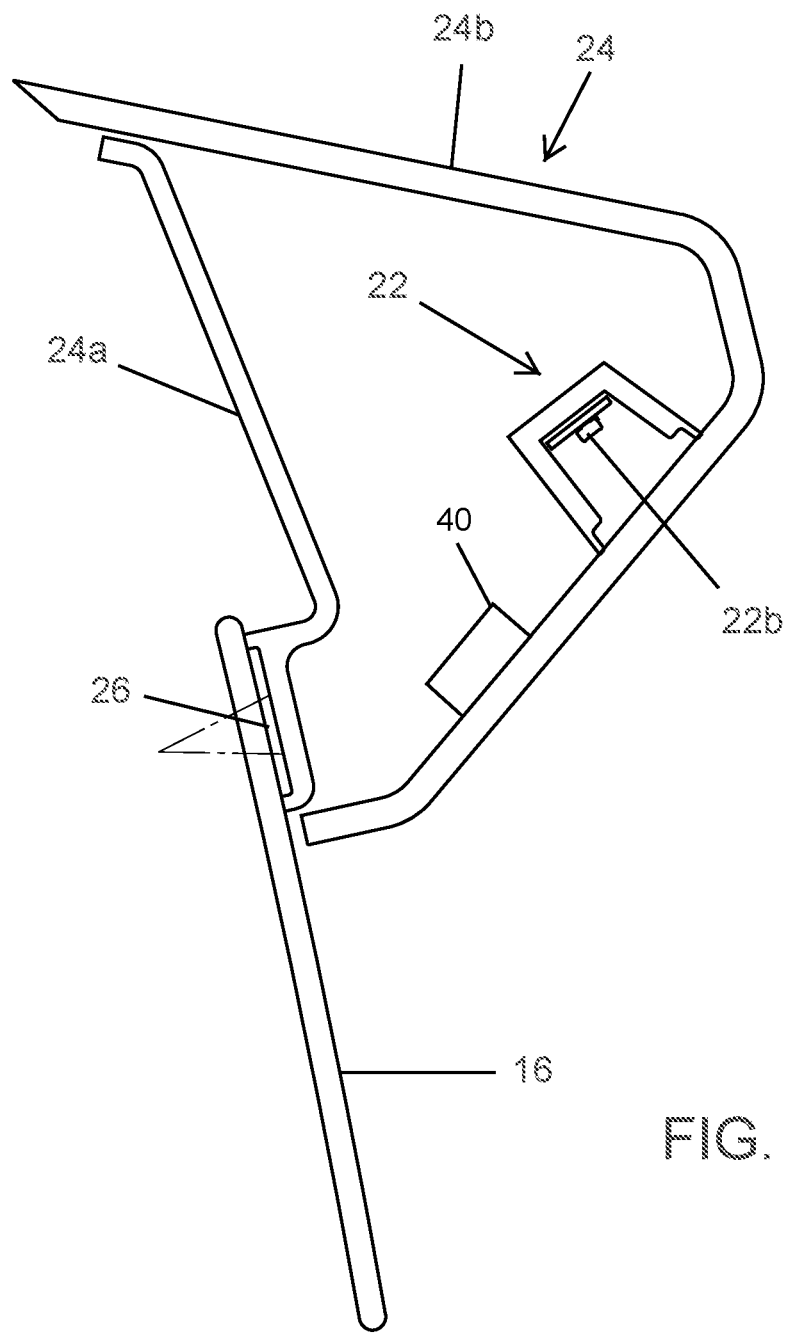
FIG. 7B is a sectional view of the window assembly taken along the line B-B in FIG. 7.
Figure 8:
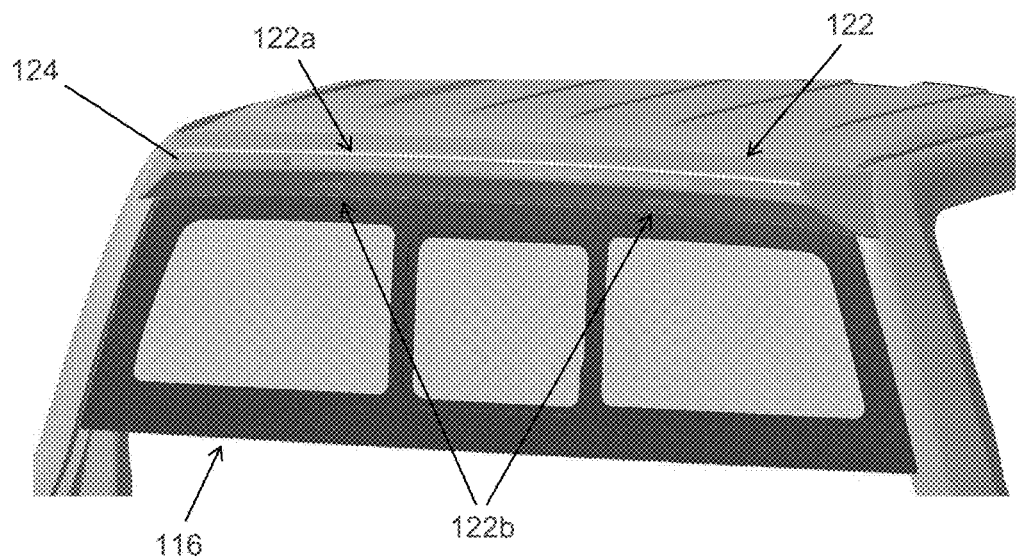
FIG. 8 is a perspective view of another window assembly, as installed at the vehicle, showing the spoiler and lighting device adhesively bonded to or integrated on the glass window panel.
Figure 9:
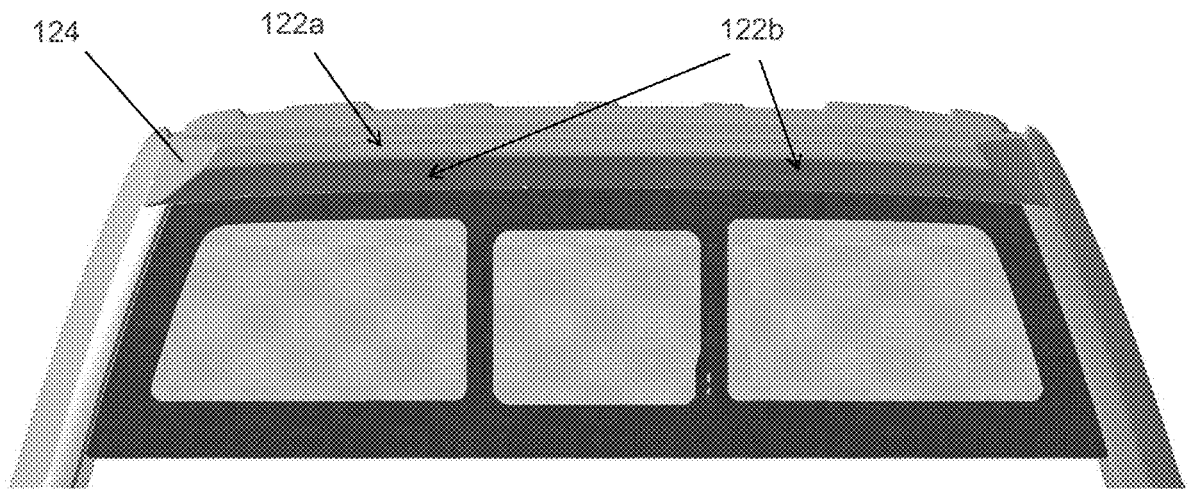
FIG. 9 is a rear plan view of the window assembly of FIG. 8.

As shown in FIGS. 7A and 7B, the spoiler 24 comprises a base portion 24a that is adhesively bonded to an upper region of the fixed window panel 16 and a cover portion 24b that is attached at the base portion 24a and shaped to provide the desired spoiler appearance. The base portion 24a is configured to be adhesively attached at the outer side of the glass window panel 16, such as via adhesive 26 disposed within and along a channel formed along a lower region of the base portion 24a. The base portion 24a and the upper and side ends of the cover portion 24b may be configured to correspond with and/or conform to the sheet metal of the vehicle along the upper rear portion of the cab of the vehicle, such that, when the modular window assembly (including the spoiler integrated thereat) is installed at the vehicle, the spoiler 24 mates with or corresponds with or conforms to the shape of the upper rear portion of the vehicle cab. For example, the edge regions of the cover portion 24b may be shaped or contoured to match respective engaging surfaces of the vehicle or window panel and optionally a seal or gasket may be disposed at the edge regions of the cover portion 24b and/or base portion 24a to conform to the engaging surfaces and preclude moisture from entering the spoiler. The cover portion 24b may attach at the base portion 24a via any suitable means, such as snap attachment or fasteners, or the cover portion 24b may be integrally formed with the base portion.

The lighting device 22 is disposed within the spoiler 24 and includes the plurality of light sources or light emitting diodes 22a, 22b that are disposed at respective circuit boards or elements and that are directed toward respective portions of the cover element 24b. The cover element 24b comprises a plastic injection molded cover and may be colored to match the color of the vehicle or to provide a contrasting color, depending on the particular application. The cover element 24b may have parts that are at least partially visible light transmitting (or near infrared light transmitting), so that the light sources of the lighting device, when powered, emit light through the light transmitting portions of the cover element so that the light passes through the cover element and is visible to and viewable by a person at or rearward of the vehicle. The cover element 24b may be tinted or colored at the partially light transmitting portions, such as a via an at least partially opaque layer applied at the light transmitting portion, so that the lighting device 22 is not readily viewable at the spoiler 24 when the lighting device 22 is not powered or activated.

The lighting device 22 is electrically connectable to a wire harness of the vehicle when the window assembly 10 is installed at the vehicle. The lighting device may utilize aspects of the lighting devices described in U.S. Pat. No. 10,559,153 and/or 10,427,503, and/or U.S. patent application Ser. No. 17/249,879, filed Mar. 17, 2021, which published on Sep. 23, 2021 as U.S. Publication No. US-2021-0296530, which are hereby incorporated herein by reference in their entireties.

The spoiler 24 and lighting device 22 are integrated at the window panel 16, such that the window assembly 10 (including the spoiler and lighting device integrated at the fixed window panel) is installed at the vehicle as a module or unit, whereby the lighting device 22 is simply electrically connected to a vehicle wire harness or the like for power and control (such as by an electronic control module or the like of the vehicle at which the window assembly is installed). When the lighting device 22 is not activated, the lighting device 22 may be covert and not readily discernible at the spoiler 24 (due to the tint or darkening or opaque layer of the cover element). Optionally, the cover element 24b may be tinted or darkened except at the location where the light sources 22b are disposed, with that portion of the cover element (where the light sources are disposed) comprising a transparent or clear or lightly tinted or translucent cover so that light emitted by the light sources 22b passes through the cover and is viewable by a person viewing the rear window assembly. By avoiding use of a darkened or tinted material at the light sources, reduced power light sources may be used since they do not have to emit light through a darkened or tinted cover.

In the illustrated embodiment, the lighting device 22 comprises a row of individual light sources 22a (such as a plurality of LEDs or OLEDs or electro-luminescent light sources or VCSELs or the like) arranged along the strip or circuit element that extends along the spoiler 24 above the aperture 18 of the fixed panel 16. The light sources 22a may comprise red light-emitting LEDs (or the light sources may be white light-emitting LEDs and the cover element at that location may be red colored so as to provide red illumination) such that the lighting device 22 comprises a center high mounted stop lamp and is actuated with the brake lights of the vehicle.

The lighting device 22 may have an electrical lead or connector for electrically connecting to a wiring harness of the vehicle and/or circuitry of the vehicle (such as brake light wiring or circuitry and/or such as a user input and a power source and/or the like) via any suitable means. For example, the lighting device 22 may electrically connect to a connector disposed at the upper region of the window assembly and near or in the spoiler 24, whereby a wiring harness or wire of the vehicle may electrically connect to the connector at the spoiler 24. Optionally, the lighting device 22 may electrically connect to a conductive trace or busbar that extends along the fixed window panel 16 to a connector at a side or lower region of the window assembly (such as shown in FIGS. 4 and 5), whereby a wiring harness may connect to the connector and to connectors for a heater grid of the window assembly at a common connecting area of the window assembly. Optionally, the lighting device may include a wire or lead that extends from the device and may be routed along or behind the cover element of the spoiler to a side region of the window assembly for electrical connection to a wiring harness or wire of the vehicle.

Optionally, the lighting device 22 may provide both a brake light function and a truck bed illumination function. For example, the lighting device 22 may include a plurality of red light-emitting LEDs 22a or the like at a center region of the window assembly 10 and a plurality of white light-emitting LEDs 22b or the like for an exterior lighting function. In the illustrated embodiment, the lighting device 22 disposed at the center region of the spoiler 24 may comprise a plurality of red light-emitting LEDs (FIG. 7A) and additional lighting devices 22b at the corner or side regions of the spoiler 24 may comprise white light-emitting LEDs (FIG. 7B) to provide the exterior or truck bed lighting function. The lighting device 22 thus may have the center or red lights 22a electrically connected to the brake light circuitry and side or white lights 22b electrically connected to a user input in the cabin of the vehicle or at the window assembly, whereby actuation of the user input actuates the side lights for illuminating the truck bed (with the side lights directing illumination rearward of the cab of the vehicle and preferably downward so as to illuminate the truck bed).

Optionally, the light sources 22b and the lighting device 22 may also or otherwise provide a turn signal indicator function, such as by emitting light responsive to actuation of a turn signal of the vehicle. For example, a turn signal indicator (comprising one or more orange or amber colored light sources or LEDs or the like) may be disposed at the side regions of the spoiler so as to be at or above the upper corners of the window panel. The light sources may be arranged or energized in an arrow-shape or chevron-shape, or an arrow-shaped or chevron-shaped or triangular-shaped window or aperture may be established through an opaque region of the cover element of the spoiler and generally at the turn signal indicator, such that, when the indicator is activated, the light is emitted through the arrow-shaped window to provide the turn signal direction to a person viewing the rear window assembly from exterior and rearward/sideward of the vehicle. Optionally, the directional information may be conveyed by the location of the light sources and/or by serial activation of the light sources from one end of the strip to the other.

Although shown and described as having light sources that emit light through the cover element 24b and thus in a rearward direction with respect to the vehicle, the window assembly and spoiler may have an integrated lighting device that includes light sources that are directed forwardly and through the base portion 24a and/or the upper region of the fixed glass panel 16 and towards and into the interior cabin of the vehicle. For example, the lighting device may include light sources (e.g., LEDs or OLEDs or electro-luminescent light sources or VCSELs or the like) that are disposed at the other side of the circuit element or otherwise configured to emit light forward, with the base portion or the glass panel optionally having an aperture or transparent portion (that may correspond with an aperture or opening at the headliner of the vehicle), such that light emitted by the interior lighting device light sources may illuminate at least a portion of the interior cabin of the vehicle.

The interior lighting function may provide illumination of the cabin or may provide a more directed or focused lighting function, such as for a dome light or a reading light or the like for a passenger sitting in a rear seat of the vehicle. The interior lighting function may be provided via one or more lighting devices, such as one at or near one or both of the side regions of the spoiler and thus at the upper corner regions of the window assembly, such that light emitted by the light sources is not at a central region that may reflect off of the interior rearview mirror to cause glare to the driver of the vehicle. Optionally, the interior lighting function or feature of the lighting device of the rear slider window assembly may be directed partially downward to limit the emitted light from being directed towards the interior rearview mirror of the vehicle.

The window assembly and spoiler thus may provide for an interior cabin lighting function that is part of or integrated with the rear slider window assembly of the vehicle, thus reducing or eliminating the need for a separate interior cabin light at the headliner of the vehicle (and thus reducing or eliminating the need for a separate wiring harness to a central light of the interior cabin of the vehicle). The lighting device(s) of the rear slider window assembly may be connected to a wiring harness that includes existing wires that electrically connect to and power the heater grid of the rear slider window assembly. Thus, the lighting device(s) of the rear slider window assembly can be powered via expansion of an existing wiring harness (to include additional wires for powering and control of the lighting devices), thereby enhancing assembly and electrical connection of the interior lighting devices at the vehicle. Optionally, the interior cabin lighting function may operate in conjunction with a cabin monitoring system or driver or occupant monitoring system, to provide illumination (such as visible light or near infrared light) at the interior cabin of the vehicle.

The window assembly, with the integrated spoiler, thus provides a spoiler as part of the window assembly, such that the window assembly and spoiler are installed at the vehicle as a single modular unit (avoiding having to separately attach a spoiler onto the cab or sheet metal of the vehicle). The spoiler may include a lighting device, which may provide a stop lamp function and/or a turn signal indicator function and/or a cargo or truck bed lighting function and/or an interior cabin lighting function.

Optionally, the spoiler may also or otherwise include a camera 40 (e.g., FIGS. 7A and 7B), which may be mounted at or within the cover element so as to view rearward and/or downward when the window assembly is installed at the vehicle. The camera may be disposed at the cover element and may view through a light-transmitting portion of the cover element or may be disposed at and view through an aperture formed through the cover element. The spoiler and camera may utilize aspects of the window assemblies described in U.S. Pat. No. 10,668,868, which is hereby incorporated herein by reference in its entirety. The camera may capture image data for use in displaying video images at a display screen within the vehicle cabin and/or for use in object detection, such as for providing rear view video images when the driver is driving the vehicle forward along a road (such as part of a camera monitoring system of the vehicle) or when the driver is reversing the vehicle. Optionally, the camera may capture image data representative of the truck bed to provide the driver a downward view into the truck bed (such as responsive to actuation of a user input within the vehicle cabin).

Optionally, the lighting device of the spoiler may, when electrically powered, emit infrared or near infrared light that passes through the spoiler so as to illuminate a region exterior and rearward of the vehicular window assembly (e.g., the truck bed) with near infrared illumination, and the camera mounted at the spoiler may comprise a camera that is sensitive to infrared or near infrared light. The camera may be configured to capture image data representative of the region illuminated by the infrared or near infrared light, such as to provide a truck bed monitoring system of the vehicle.

Optionally, the camera may be disposed in the spoiler so as to view through the window panel and into the interior cabin of the vehicle (such as at an aperture of the base portion and viewing through a light transmissive portion of the window assembly where the spoiler is attached at the window assembly), such as for an occupant monitoring system. The camera viewing into the interior cabin of the vehicle may view a region of the cabin of the vehicle that is illuminated by infrared or near infrared light or visible light emitted by the lighting device of the spoiler. For example, the interior lighting device may emit visible light when electrically powered to provide the interior cabin lighting function, or the interior lighting device may emit infrared or near infrared light when electrically powered to provide near infrared illumination in the interior cabin for the cabin monitoring or occupant monitoring camera.

Figure 10:
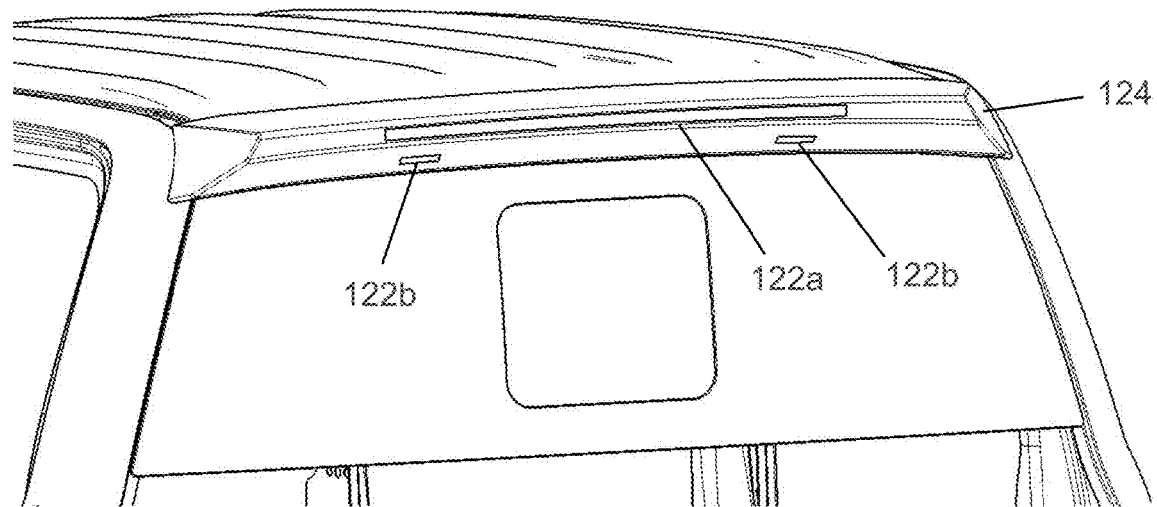
FIG. 10 is another perspective view of the window assembly of FIG. 8.
Figure 11:
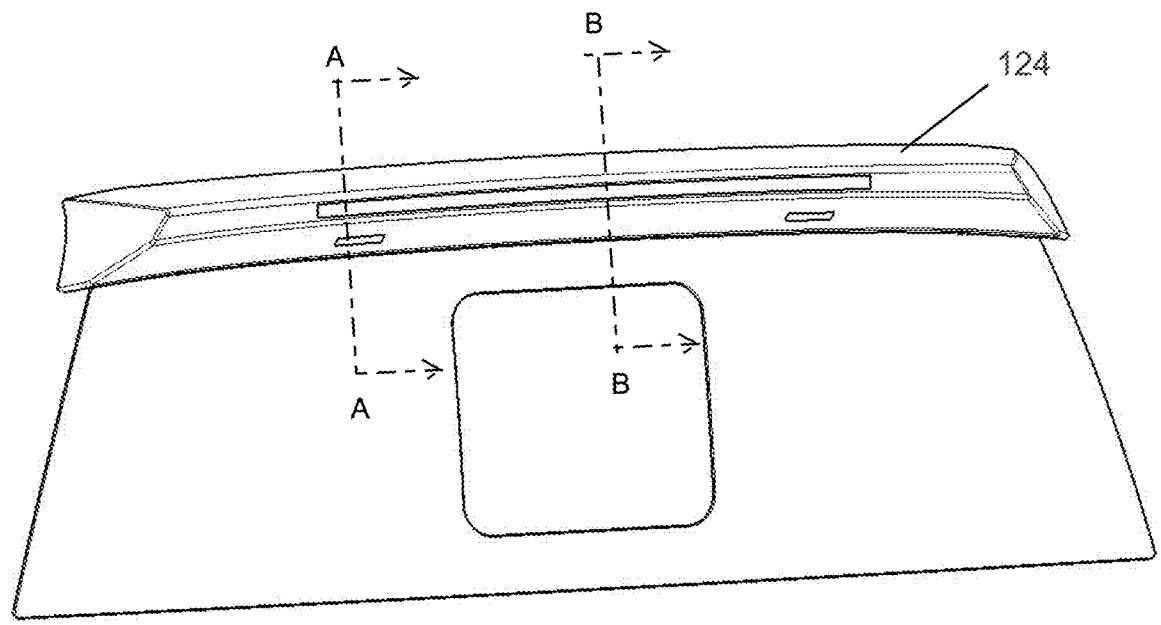
FIG. 11 is another perspective view of the window assembly, shown without the vehicle, and showing the lighting device at the spoiler.

Optionally, and such as shown in FIGS. 8-11B, a spoiler 124 configured to adhesively bond or otherwise attach onto or integrate into a glass window panel 116 (such as a fixed window panel of a rear window or rear slider window of a pickup truck) includes a lighting system having a lighting device 122 disposed within the spoiler 124, where the lighting device 122 includes a first light source 122*a* and a second light source 122*b*. The first light source or plurality of first light sources 122*a*, such as LEDS, OLEDs, VCSELs, or other suitable electro-luminescent light sources, are arranged at an upper center region of the spoiler 124 above the fixed window panel 116, such as for a CHMSL of the vehicle. The second light source or plurality of second light sources 122*b* are disposed at side regions of the spoiler 124 and are angled downward and rearward, such as for a truck bed illumination system or a turn signal indicator. As shown in FIGS. 10 and 11, the first light sources 122*a* may extend in a row along an upper portion of the spoiler 124 at a center region of the spoiler and the second light sources 122*b* may extend in rows along a lower portion of the spoiler 124 at respective side regions of the lower portion of the spoiler. The first light sources 122*a* may extend substantially across the length of the spoiler 124 or the first light sources 122*a* may extend along a length of the spoiler only at the center region of the spoiler.

Figure 11A:
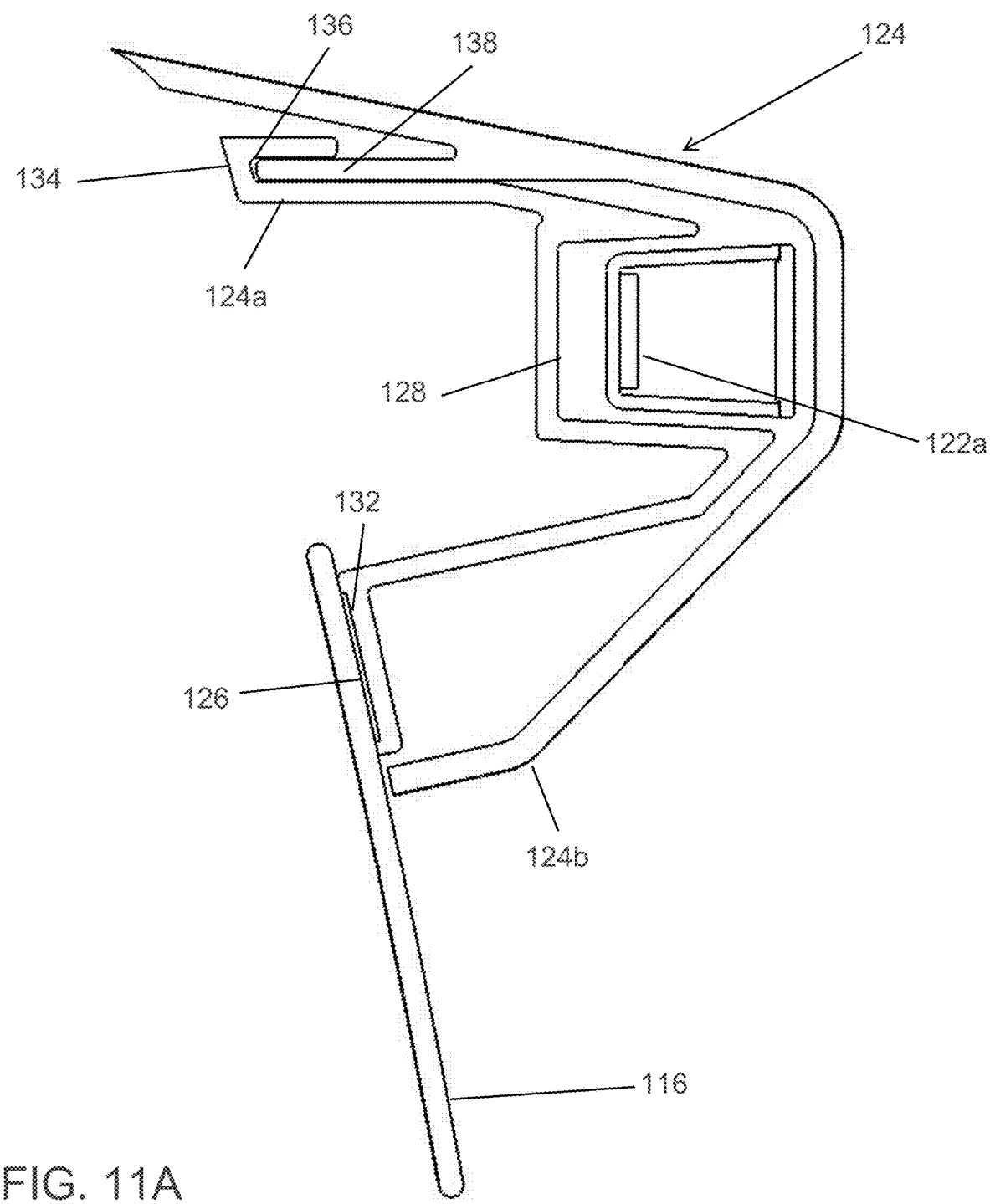
FIG. 11A is a sectional view of the window assembly taken along the line A-A in FIG. 11.
Figure 11B:
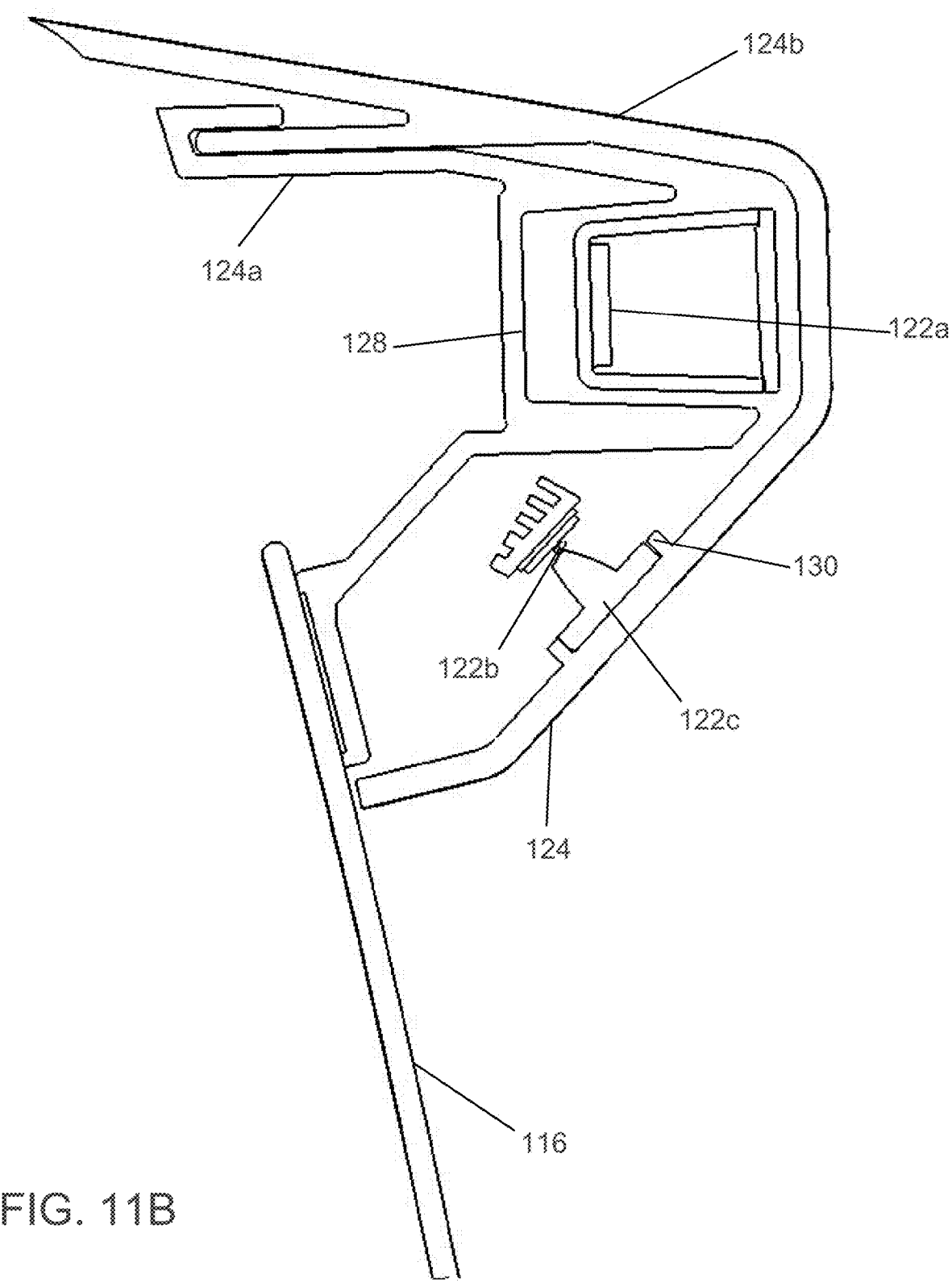
FIG. 11B is a sectional view of the window assembly taken along the line B-B in FIG. 11.

As shown in FIGS. 11A and 11B, the spoiler 124 includes a base portion 124*a* and a cover portion 124*b*. The base portion 124*a* is attached at the fixed window panel 116, such as via adhesive 126 disposed within and along a channel 132 formed along a lower portion of the base portion 124*a*, the adhesive 126 attached to the outer side of the window panel 116. The base portion 124*a* may attach at the window panel 116 at more than one location. For example, the base portion 124*a* may attach at the window panel 116 via the adhesive 126 disposed within the channel 132 at a lower portion of the base portion and the base portion 124*a* may attach (such as via adhesive) at an upper attaching surface 134 at an upper portion of the base portion 124*a*. The cover portion 124*b* attaches at the base portion 124*a* in any suitable means, such as via snap attachment or fasteners. For example, the upper portion of the base portion 124*a* may include a receiving portion or slot 136, such as a substantially J-shaped slot, that receives a corresponding lip or tab 138 of the cover portion 124*b* to secure the cover portion 124*b* to the base portion 124*a*. The cover portion 124*b* may separately snap attach to the base portion 124*a*, such as at or near the channel 132 adhesively attached at the window panel 116. Optionally, the lip 138 may be received in the channel 132 and a lower part or edge region of the cover portion may snap onto the lower part of the base portion (such as near or at where the base portion is adhesively attached at the window panel). Thus, the base portion 124*a* is attached at the window panel 116 and the cover portion 124*b* attaches to the base portion 124*a*, such as via inserting a tab or lip into a slot at an upper position and snap attaching at a lower position, to secure the cover portion 124*b* at the base portion 124*a*. The cover portion 124*b* may fully cover or envelop or hide the base portion when attached at the base portion 124*a* so that only the cover portion 124*b* is exposed or viewable at the exterior of the vehicle. Thus, the base portion may be entirely between an inner surface of the cover portion and the outer surface of the window panel 116.

The first light sources 122*a* and the second light sources 122*b* may be attached at the base portion 124*a* or the cover portion 124*b*. For example, both the first and second light sources may be attached at the base portion or both the first and second light sources may be attached at the cover portion or one of the first and second light sources may be attached at the base portion and the other of the first and second light sources may be attached at the cover portion. Optionally, the first and/or second light sources may be attached at the base portion 124*a* and, when electrically operated, transmit light through an optic element, such as a light guiding element or translucent element or light diffuser or the like, at the cover portion 124*b* to illuminate a region exterior the vehicle.

In the illustrated example, the base portion 124*a* includes a channel or receiving portion 128 that is configured to receive the first light sources 122*a* so that, with the cover portion 124*b* attached at the base portion 124, the first light sources 122*a* are disposed behind or underneath the cover portion 124*b*. Thus, the first light sources 122*a* are received within the base portion 124*a* of the spoiler 124 and are, with the cover portion 124b attached at the base portion 124a, disposed behind the cover portion 124b, such as to emit light through an at least partially light transmitting portion of the cover portion 124b, such as discussed above. The first light sources 122a may electrically connect to the wire harness of the vehicle via an electrical connection at the base portion 124a of the spoiler 124.

The second light sources 122b may similarly be disposed at a receiving portion of the base portion 124a or, optionally, the second light sources may be disposed at the cover portion 124. As shown in FIG. 11B, the second light sources 122b may be disposed at the base portion 124a and transmit light through an optic element or light guiding or translucent element 122c disposed at a receiving portion 130 of the cover portion 124b. For example, the second light sources 122b may include a light guiding element or translucent element or light diffuser 122c that is received at the receiving portion 130 integrally formed with an inner surface of the cover portion 124b. The second light sources 122b comprise one or more LEDs disposed on a circuit board or strip, with the light guiding element 122c disposed at the LEDs so that light emitted by the LEDs passes through the light guiding element 122c to provide illumination at the truck bed. Optionally, the light guiding element 122c may comprise a diffuse translucent or light transmitting material that provides diffuse illumination of the truck bed when the LEDs are energized. The circuit board or strip may have heat dissipating fins or the like disposed therealong to reduce or dissipate heat generated by the second light sources during operation. The second light sources thus may be disposed at the base portion, at the cover portion, or between the base portion 124a and the cover portion 124b and configured to emit light through the cover portion 124b. The spoiler 124 and lighting device 122 is otherwise similar to the spoilers and lighting devices discussed above, such that a detailed discussion of the spoilers and lighting devices need not be repeated herein.

Therefore, a rear window assembly for a pickup truck has a spoiler integrated onto the fixed window panel. The rear window assembly thus provides a single modular system that eliminates the need for two or more separate assemblies in the assembly plant. The window assembly, including the integrated spoiler, provides environment improvement by integrating the lighting device within the spoiler and by attaching the spoiler directly to the fixed window panel so that the window assembly (including the spoiler and lighting device) is installed at the vehicle as a module or unit. The window assembly provides a reduction of labor at the vehicle assembly plant, and eliminates labor at the assembly plant for installing a separate center high mounted stop lamp (CHMSL). The lighting device and window assembly with integrated spoiler also reduces or substantially eliminates leak paths that often occur between traditional CHMSLs and the vehicle sheet metal.

Thus, the window assembly provides lighting at or above the fixed window panel to provide a flush glass window with no separate stop lamp or bed lighting at or above the window assembly (such as at the vehicle cab or sheet metal). The lighting device may be powered via any suitable wiring or electrically conductive traces or busbars at the window assembly, and may be readily electrically connected to wiring or circuitry of the vehicle when the window assembly is installed at the vehicle.

The illumination sources and lighting device thus may comprise a brake light, such as for a center high mounted stop lamp of the vehicle, whereby the illumination source may be activated upon actuation of the vehicle brakes. Optionally, the lighting device may comprise an illumination source or light for illuminating the bed of the pickup, such as one or more lights that are directed so as to provide white (or substantially white) light or illumination to illuminate the pickup bed, such as in response to a user input or button or switch. Optionally, the window assembly may include a first illumination source or first set of light sources for a center high mounted stop lamp and may include a second illumination source or second set of light sources for another function or feature (such as for providing light to the pickup bed). The spoiler and lighting device may be attached to the fixed window panel of a rear slider window assembly, or the spoiler and lighting device may be attached to or integrated on a fixed window panel of a full-pane fixed (non-slider) rear window assembly or the like, or may be attached to or integrated on a fixed glass panel of a rear window or rear liftgate of a vehicle.

The movable or slider window panel may be movable such as via manual pushing or pulling at the window panel and preferably is movable in response to actuation of a drive motor of the drive motor assembly or system, which may move cables or wires of cable assemblies relative to the sheath of the cable assemblies to impart horizontal movement of the carrier and slider window panel along the upper and lower rails. Optionally, the drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293 and/or 8,938,914, and/or U.S. Publication Nos. 2004-0020131 and/or 2008-0127563, which are all hereby incorporated herein by reference in their entireties.

Optionally, the fixed window panel or panels may include an electrically conductive heater grid or other heating element or electrically operable element established at the window panel or panels (such as at or on an interior surface of the window panel) and the movable window panel may include an electrically conductive heater grid or other heating element or electrically operable element established at the movable window panel (such as at or on an interior surface of the movable window panel). Optionally, the heater grids may be laminated within the fixed window panel and/or the movable window panel, such as by utilizing aspects of the window assemblies described in U.S. Pat. No. 10,524,313, which is hereby incorporated herein by reference in its entirety. The heater grids are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels. The movable panel heater grid is electrically connected to the power source (and may be electrically connected to electrical terminals or elements at one of the heater grids of the fixed window panels) and may be electrically powered to heat or defrost or defog the movable window panel. The heater grids comprise a plurality of electrically conductive traces that extend across the respective window panels between respective busbars to provide enhanced and more uniform heating and defrosting/defogging of the window panel. The heater grid of the movable window panel may be powered in a manner that allows for heating or defogging or defrosting of the movable window panel irrespective of whether the movable window panel is opened or partially opened or closed. For example, the electrical connections may be made via a flexible electrical connector or wire or cable or the like, such as by utilizing aspects of the rear slider window assemblies described in U.S. Pat. No. 8,881,458 and/or 8,402,695, which are hereby incorporated herein by reference in their entireties. Optionally, the heater grid of the movable window panel may be powered only when in its closed position and/or via any suitable powering means.

Optionally, the window assembly or assemblies may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. 2006-0107600; 2008-0127563; 2004-0020131 and/or 2003-0213179, and/or International Publication No. WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear window assembly comprising:
a window panel comprising an inner side and an outer side;
a spoiler comprising (i) a base portion that is adhesively attached at and along an upper region of the outer side of the window panel and (ii) a cover portion that is attached at the base portion;
wherein the vehicular rear window assembly, with the spoiler adhesively attached at and along the upper region of the outer side of the window panel, is configured for mounting at a rear portion of a cabin of a vehicle;
wherein, with the vehicular rear window assembly mounted at the rear portion of the cabin of the vehicle, the inner side is toward the cabin of the vehicle and the outer side and the spoiler are exterior of the vehicle;
wherein the spoiler comprises a lighting device having a plurality of light sources arranged on a circuit element, and wherein the light sources, when electrically powered, emit light that, with the vehicular rear window assembly mounted at the rear portion of the cabin of the vehicle, passes through the spoiler; and
wherein the lighting device includes light sources that are operable as interior lighting light sources, and wherein the interior lighting light sources, with the vehicular rear window assembly mounted at the rear portion of the cabin of the vehicle, and when the interior lighting light sources are electrically powered responsive to actuation of a user actuatable input, emit light that passes through the window panel to illuminate at least a portion of the cabin of the vehicle.

2. The vehicular rear window assembly of claim 1, wherein the light sources, when electrically powered, emit light that, with the vehicular rear window assembly mounted at the rear portion of the cabin of the vehicle, passes through the cover portion of the spoiler so as to be viewable by a person viewing the vehicular rear window assembly from exterior and rearward of the vehicle.

3. The vehicular rear window assembly of claim 2, wherein, with the vehicular rear window assembly mounted at the rear portion of the cabin of the vehicle, at least some of the light sources of the lighting device are electrically powered responsive to actuation of a brake system of the vehicle to provide a center high mounting stop lamp feature that is integrated within the spoiler of the vehicular rear window assembly.

4. The vehicular rear window assembly of claim 2, wherein the lighting device includes light sources that are operable as exterior illumination light sources of the vehicle, and wherein the exterior illumination light sources, with the vehicular rear window assembly mounted at the rear portion of the cabin of the vehicle, and when the lighting device is electrically powered responsive to actuation of a user actuatable input, emit white light that passes through the cover portion of the spoiler and that is directed at least in part downwardly so as to illuminate a rear exterior portion of the vehicle.

5. The vehicular rear window assembly of claim 2, wherein the lighting device includes light sources that are operable as turn signal indicating light sources, and wherein the turn signal indicating light sources, with the vehicular rear window assembly mounted at the rear portion of the cabin of the vehicle, and when the turn signal indicating light sources are electrically powered responsive to actuation of a turn signal of the vehicle, emit light that passes through the cover portion of the spoiler to indicate actuation of the turn signal to a person viewing the vehicular rear window assembly from rearward of the vehicle.

6. The vehicular rear window assembly of claim 1, wherein the light sources comprise a plurality of light emitting diodes arranged on the circuit element.

7. The vehicular rear window assembly of claim 1, wherein the light sources comprise one selected from the group consisting of (i) light emitting diodes (LEDs), (ii) micro-LEDs, (iii) organic light emitting diodes (OLEDs), (iv) electro-luminescent light sources, and (v) vertical-cavity surface-emitting lasers (VCSELs).

8. A The vehicular rear window assembly comprising:
a window panel comprising an inner side and an outer side;
a spoiler comprising (i) a base portion that is adhesively attached at and along an upper region of the outer side of the window panel and (ii) a cover portion that is attached at the base portion;
wherein the vehicular rear window assembly, with the spoiler adhesively attached at and along the upper region of the outer side of the window panel, is configured for mounting at a rear portion of a cabin of a vehicle;
wherein, with the vehicular rear window assembly mounted at the rear portion of the cabin of the vehicle, the inner side is toward the cabin of the vehicle and the outer side and the spoiler are exterior of the vehicle;
wherein the spoiler comprises a lighting device having a plurality of light sources arranged on a circuit element, and wherein the light sources, when electrically powered, emit light that, with the vehicular rear window assembly mounted at the rear portion of the cabin of the vehicle, passes through the spoiler; and
wherein the lighting device includes a plurality of first light sources attached at the base portion of the spoiler and a plurality of second light sources attached at the cover portion, both the plurality of first light sources and the plurality of second light sources, when electrically powered, emit light that passes through the cover portion of the spoiler.

9. The vehicular rear window assembly of claim 1, wherein the spoiler comprises a camera disposed at or behind the cover portion and, with the vehicular rear window assembly mounted at the rear portion of the cabin of the vehicle, viewing at least downward and/or rearward of the spoiler.

10. The vehicular rear window assembly of claim 9, wherein the camera views through a light-transmitting portion of the cover portion.

11. The vehicular rear window assembly of claim 9, wherein the camera is disposed at an aperture through the cover portion of the spoiler.

12. The vehicular rear window assembly of claim 1, wherein the vehicular rear window assembly, with the spoiler adhesively attached at and along the upper region of the outer side of the window panel, is configured for mounting at the rear portion of the cabin of the vehicle by adhesively attaching the window panel at sheet metal of the rear portion of the cabin of the vehicle.

13. The vehicular rear window assembly of claim 1, wherein the cover portion of the spoiler snap attaches at the base portion of the spoiler.

14. The vehicular rear window assembly of claim 1, wherein the vehicular rear window assembly is configured to be mounted at a rear portion of a cabin of a pickup truck.

15. The vehicular rear window assembly of claim 14, wherein the vehicular rear window assembly comprises a vehicular rear slider window assembly comprising a movable window panel and a frame portion having an upper rail and a lower rail, and wherein the window panel is fixed relative to the frame portion, and wherein the window panel comprises an opening, and wherein the movable window panel is movable along the upper rail and the lower rail, and wherein the movable window panel is movable between a closed position, where the movable window panel is disposed at the opening, and an opened position, where the movable window panel is disposed at least partially along the window panel, and wherein the spoiler is disposed along an upper region of the window panel and above the opening.

16. A vehicular rear window assembly comprising:
a window panel comprising an inner side and an outer side;
a spoiler comprising (i) a base portion that is adhesively attached at and along an upper region of the outer side of the window panel and (ii) a cover portion that is attached at the base portion;
wherein the cover portion snap attaches at the base portion;
wherein the vehicular rear window assembly, with the spoiler adhesively attached at and along the upper region of the outer side of the window panel, is configured for mounting at a rear portion of a cabin of a vehicle;
wherein, with the vehicular rear window assembly mounted at the rear portion of the cabin of the vehicle, the inner side is toward the cabin of the vehicle and the outer side and the spoiler are exterior of the vehicle;
wherein the spoiler comprises (i) a first lighting device having a plurality of first light sources arranged on a first circuit element and (ii) a second lighting device having a plurality of second light sources arranged on a second circuit element;
wherein the plurality of first light sources and the plurality of second light sources, when electrically powered, emit light that, with the vehicular rear window assembly mounted at the rear portion of the cabin of the vehicle, passes through the cover portion of the spoiler so as to be viewable by a person viewing the vehicular rear window assembly from exterior and rearward of the vehicle;
wherein, with the vehicular rear window assembly mounted at the rear portion of the cabin of the vehicle, the plurality of first light sources is electrically powered responsive to actuation of a brake of the vehicle to provide a center high mounting stop lamp feature that is integrated within the spoiler of the vehicular rear window assembly; and
wherein the spoiler comprises a third lighting device, and wherein the third lighting device, with the vehicular rear window assembly mounted at the rear portion of the cabin of the vehicle, and when the third lighting device is electrically powered responsive to actuation of a user actuatable input, emits light that passes through the base portion of the spoiler and through the window panel to illuminate at least a portion of the cabin of the vehicle.

17. The vehicular rear window assembly of claim 16, wherein the plurality of second light sources, with the vehicular rear window assembly mounted at the rear portion of the cabin of the vehicle, and when the plurality of second light sources is electrically powered responsive to actuation of a user actuatable input, emit white light that passes through the cover portion of the spoiler and that is directed at least in part downwardly so as to illuminate a rear exterior portion of the vehicle.

18. The vehicular rear window assembly of claim 16, wherein the plurality of second light sources is operable as turn signal indicating light sources, and wherein the plurality of second light sources, with the vehicular rear window assembly mounted at the rear portion of the cabin of the vehicle, and when the plurality of second light sources is electrically powered responsive to actuation of a turn signal of the vehicle, emit light that passes through the cover portion of the spoiler to indicate actuation of the turn signal to a person viewing the vehicular rear window assembly from rearward of the vehicle.

19. The vehicular rear window assembly of claim 16, wherein (i) the first circuit element of the first lighting device is attached at the base portion of the spoiler and/or (ii) the second circuit element of the second lighting device is attached at the base portion of the spoiler.

20. The vehicular rear window assembly of claim 16, wherein the plurality of second light sources, with the vehicular rear window assembly mounted at the rear portion of the cabin of the vehicle, and when the plurality of second light sources is electrically operated, emits light that passes through a light guiding element attached at the cover portion of the spoiler, wherein the light passes through the light guiding element and is directed at least in part downwardly so as to illuminate a rear exterior portion of the vehicle.

21. The vehicular rear window assembly of claim 16, wherein the spoiler comprises a camera disposed at or behind the cover portion and viewing at least downward and/or rearward of the spoiler.

22. The vehicular rear window assembly of claim 16, wherein the vehicular rear window assembly is configured to be mounted at a rear portion of a cabin of a pickup truck.

23. A vehicular rear window assembly comprising:
a window panel comprising an inner side and an outer side;
a spoiler comprising (i) a base portion that is adhesively attached at and along an upper region of the outer side of the window panel and (ii) a cover portion that is attached at the base portion;
wherein the base portion comprises an attaching element, and wherein the base portion is adhesively attached at and along the window panel via adhesive disposed between the attaching element and the outer side of the window panel;

wherein the cover portion snap attaches at the base portion;

wherein the vehicular rear window assembly, with the spoiler adhesively attached at and along the upper region of the outer side of the window panel, is configured for mounting at a rear portion of a cabin of a vehicle;

wherein, with the vehicular rear window assembly mounted at the rear portion of the cabin of the vehicle, the inner side is toward the cabin of the vehicle and the outer side and the spoiler are exterior of the vehicle;

wherein the spoiler comprises a lighting device having at least one light source that, when electrically powered, emits light that passes through a light transmissive portion of the window panel; and wherein, with the vehicular rear window assembly mounted at the rear portion of the cabin of the vehicle, the at least one light source, when electrically powered, emits light that passes through the light transmissive portion of the window panel so as to illuminate an interior portion of the cabin of the vehicle.

24. The vehicular rear window assembly of claim 23, wherein the at least one light source is electrically powered responsive to actuation of a user actuatable input.

25. The vehicular rear window assembly of claim 23, wherein, with the vehicular rear window assembly mounted at the rear portion of the cabin of the vehicle, the lighting device is part of an occupant monitoring system of the vehicle.

26. The vehicular rear window assembly of claim 25, wherein the spoiler comprises a camera that, with the vehicular rear window assembly mounted at the rear portion of the cabin of the vehicle, is part of the occupant monitoring system, and wherein the camera, with the vehicular rear window assembly mounted at the rear portion of the cabin of the vehicle, views through the window panel and views a portion of the cabin of the vehicle that is illuminated by the lighting device when the at least one light source is electrically powered.

27. The vehicular rear window assembly of claim 23, wherein the light transmissive portion of the window panel comprises a light transmissive aperture formed through a non-light transmitting coating at the window panel.

* * * * *

UNITED STATES PATENT AND TRADEMARK OFFICE
CERTIFICATE OF CORRECTION

PATENT NO.         : 11,691,482 B2
APPLICATION NO.    : 17/449324
DATED              : July 4, 2023
INVENTOR(S)        : Darin J. Snider et al.

It is certified that error appears in the above-identified patent and that said Letters Patent is hereby corrected as shown below:

In the Claims

<u>Column 12</u>
Line 33, Claim 8, "8. A The vehicular" should be --8. A vehicular--

Signed and Sealed this
First Day of August, 2023

Katherine Kelly Vidal
*Director of the United States Patent and Trademark Office*